US012451276B2

(12) United States Patent
Chyla et al.

(10) Patent No.: US 12,451,276 B2
(45) Date of Patent: Oct. 21, 2025

(54) CONDUCTOR ASSEMBLY

(71) Applicant: Siemens Energy Global GmbH & Co. KG, Munich (DE)

(72) Inventors: Thomas Chyla, Berlin (DE); Armin Grund, Berlin (DE); Karsten Hatz, Berlin (DE); Ralf Rössler, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 214 days.

(21) Appl. No.: 18/248,265

(22) PCT Filed: Sep. 13, 2021

(86) PCT No.: PCT/EP2021/075094
§ 371 (c)(1),
(2) Date: Apr. 7, 2023

(87) PCT Pub. No.: WO2022/073722
PCT Pub. Date: Apr. 14, 2022

(65) Prior Publication Data

US 2023/0377781 A1 Nov. 23, 2023

(30) Foreign Application Priority Data

Oct. 7, 2020 (DE) ..................... 10 2020 212 640.2

(51) Int. Cl.
*H01T 4/02* (2006.01)
*H01C 7/12* (2006.01)
*H01T 4/04* (2006.01)
*H01T 4/10* (2006.01)

(52) U.S. Cl.
CPC ................. *H01C 7/12* (2013.01); *H01T 4/02* (2013.01); *H01T 4/04* (2013.01); *H01T 4/10* (2013.01)

(58) Field of Classification Search
CPC .... H01T 4/08; H01T 4/06; H01T 4/20; H01T 1/20; H01T 1/14; H01T 1/15; H01C 7/12; H01C 7/126
See application file for complete search history.

(56) References Cited

FOREIGN PATENT DOCUMENTS

| | | | | |
|---|---|---|---|---|
| EP | 2466596 A1 * | 6/2012 | ............. | H01C 1/024 |
| EP | 2846333 A1 | 3/2015 | | |
| EP | 3001430 A1 | 3/2016 | | |
| EP | 3048617 A1 | 7/2016 | | |
| EP | 3082136 A1 | 10/2016 | | |
| EP | 3208811 A1 | 6/2017 | | |
| EP | 3514899 A1 | 7/2019 | | |
| JP | 2000232708 A | 8/2000 | | |

OTHER PUBLICATIONS

EP_2466596 Translation (Year: 2012).*

* cited by examiner

*Primary Examiner* — Bryan R Perez
(74) *Attorney, Agent, or Firm* — Laurence A. Greenberg; Werner H. Stemer; Ralph E. Locher

(57) ABSTRACT

A conductor assembly includes an electrical conductor, a surge arrester which has a longitudinal direction, an operating state in which the surge arrester is configured to limit an overvoltage occurring in the electrical conductor, and a test state in which the surge arrester is not configured to limit the overvoltage. An electrically insulating support is disposed between the surge arrester and the electrical conductor in the longitudinal direction. The support is supported by the electrical conductor, and the surge arrester is supported by the support.

16 Claims, 1 Drawing Sheet

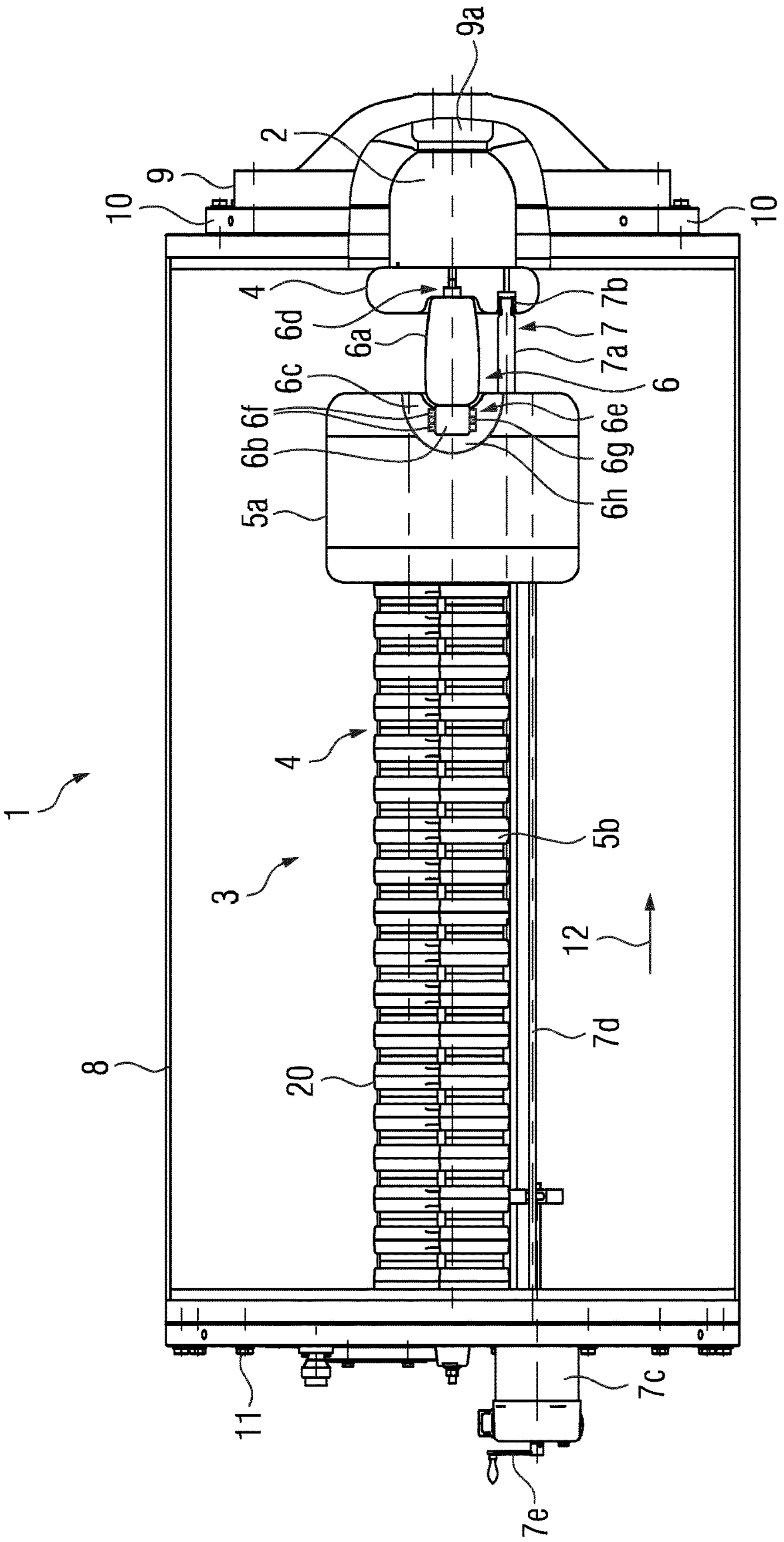
9a
2
9
10
10
4
7b
6d
6a
7a 7
6c
6
6f
6e
6b
6g
6h
5a
4
1
5b
3
12
8
7d
20
11
7c
7e

CONDUCTOR ASSEMBLY

FIELD AND BACKGROUND OF THE INVENTION

The invention relates to a conductor assembly.

A surge arrester is intended to limit overvoltages such as can occur in the event of a lightning strike, for example.

The surge arrester can be a long and heavy element that needs to be supported. When a permanently installed electrical conductor is used, the electrical conductor can support the surge arrester. If the surge arrester is not supported, this can lead to the surge arrester deforming on account of its own weight, as a result of which damage to the surge arrester can occur when the surge arrester is transported, and the life of the surge arrester is shortened. Switchable surge arresters exist wherein an electrical connection from the electrical conductor to the surge arrester is breakable. Breaking the electrical connection from the electrical conductor to the surge arrester can be relevant for example in order to perform a high-voltage test on the electrical conductor. However, if the electrical connection from the electrical conductor to the surge arrester is broken, the surge arrester cannot be supported by the electrical conductor. This can lead to the life of the surge arrester being shortened.

SUMMARY OF THE INVENTION

It is therefore an object of the invention to provide a conductor assembly having a surge arrester wherein a surge arrester has a long life.

The conductor assembly according to the invention comprises an electrical conductor, a surge arrester that has a longitudinal direction, an operating state, in which the surge arrester is designed to limit an overvoltage occurring in the electrical conductor, and a test state, in which the surge arrester is not designed to limit the overvoltage, and an electrically insulating support arranged between the surge arrester and the electrical conductor in the longitudinal direction, the support being supported by the electrical conductor and the surge arrester being supported by the support. As a result of there being provision for the support, the surge arrester is supported indirectly by the electrical conductor both in the operating state and in the test state. This allows damage to be prevented when the conductor assembly is transported, and the life of the surge arrester is long.

The surge arrester preferably comprises a conductor connection, at least part of which is arranged so as to be moveable relative to the remaining surge arrester and is therefore designed to switch the surge arrester between the operating state and the test state, the conductor connection projecting further from the remaining surge arrester in the operating state than in the test state. As a result, the surge arrester can be put into the operating state by moving the conductor connection toward the electrical conductor and can be put into the test state by moving the conductor connection away from the first conductor. In the operating state there is an electrically conductive connection from the electrical conductor to the surge arrester, and in the test state the electrically conductive connection is interrupted.

It is preferred for the conductor assembly to comprise a moving connection by means of which the surge arrester and the support are coupled to one another in such a way that the support can move relative to the surge arrester in the longitudinal direction. In this case, it is particularly preferred for there to be provision for a gap between the surge arrester and the support in the longitudinal direction. This allows thermal expansions, for example in the conductor, in the support and/or in the surge arrester, to be compensated for by virtue of the gap becoming narrower in the longitudinal direction. This allows mechanical stresses in the conductor assembly to be avoided during thermal expansion, as a result of which the life of the conductor assembly is particularly long. It is moreover particularly preferred for the recess to have, between the support and the surge arrester, a flexible ring arranged in it, the axis of rotation of which is substantially parallel to the longitudinal direction. This allows lateral forces, which have a component perpendicular to the longitudinal direction, to be cushioned. By way of example, the lateral forces can be relevant when the conductor assembly is transported. As a result of the lateral forces being cushioned, the life of the conductor assembly is particularly long.

It is preferred for the surge arrester to comprise a contact hood that is arranged at that longitudinal end of the surge arrester that faces the electrical conductor, and in which the moving connection and in particular the recess is arranged. The contact hood can be electrically conductive and, to this end, can comprise a metal, for example. It is particularly preferred for the contact hood to have a geometry that leads to a reduction in the electrical field strengths with respect to the electrical conductor and with respect to a ground. To this end, the contact hood can have rounded corners, for example.

The conductor assembly preferably comprises an electrically conductive element that is designed to connect the support electrically conductively to the surge arrester, in particular to the contact hood. The longitudinal end of the support that faces the surge arrester can comprise an electrically conductive contact piece that makes contact with the electrically conductive element. This allows the partial discharges on the contact piece to be avoided, as a result of which the life of the conductor assembly is particularly long. The electrically conductive element is particularly preferably a contact spring, in particular a helical spring, or a socket that comprises inwardly projecting lamellae.

It is preferred for the conductor assembly to comprise a permanent connection by means of which the support is attached permanently to the electrical conductor.

It is preferred for the conductor assembly to comprise an electrically conductive contact disk that is arranged between the support and the electrical conductor in the longitudinal direction and via which the electrical conductor is connected electrically conductively to the surge arrester in the operating state. It is conceivable for the contact disk to make contact with the electrical conductor. It is particularly preferred for the support to be screwed permanently to the contact disk. It is moreover preferred for the contact disk to be attached permanently to the electrical conductor. This can be achieved for example by virtue of the contact disk being screwed to the electrical conductor. The permanent connection can be formed for example by virtue of the contact disk being screwed to the support, and the contact disk being screwed to the electrical conductor. The surge arrester particularly preferably comprises a conductor connection, at least part of which is arranged so as to be movable relative to the remaining surge arrester and is therefore designed to switch the surge arrester between the operating state and the test state, the conductor connection projecting further from the remaining surge arrester in the operating state than in the test state, the contact disk comprising a contact recess and the conductor connection comprising a contact pin that is arranged in the contact recess in the operating state and is arranged outside the contact recess in the test state. As a result of the conductor connection making contact with the contact disk, the conductor connection and the electrode are connected electrically conductively to one another.

The surge arrester preferably comprises a varistor or a plurality of varistors. The plurality of varistors can be connected in series and/or parallel. The varistor or varistors can be connected electrically conductively to the conductor connection in the operating state. The varistor or varistors can be metal oxide varistors (MOV), for example.

The conductor assembly preferably comprises a housing that encapsulates the electrical conductor, the surge arrester and the support. Such a conductor assembly is suitable wherever it is not possible to produce the electrical conductor as an overhead line, such as for example in a power station or in a transformer station. The electrical conductor is particularly preferably supported by the housing and/or by a wall that separates two chambers in the The invention is explained more thoroughly below with reference to the appended schematic drawing.

BRIEF DESCRIPTION OF THE FIGURE

The FIGURE shows a section through a conductor assembly. housing from one another.

DETAILED DESCRIPTION OF THE INVENTION

As can be seen from the FIGURE, a conductor assembly 1 comprises an electrical conductor 2, a surge arrester 3 that has a longitudinal direction 12, an operating state, in which the surge arrester 3 is designed to limit an overvoltage occurring in the electrical conductor 2, and a test state, in which the surge arrester 3 is not designed to limit the overvoltage, and an electrically insulating support 6 that is arranged between the surge arrester 3 and the electrical conductor 2 in the longitudinal direction 12, the support 6 being supported by the electrical conductor 2 and the surge arrester 3 being supported by the support 6. The surge arrester 3 can have a longitudinal end that is remote from the electrical conductor 2 and electrically conductively connected to a ground 11. By way of example, the conductor 2 can be designed to conduct a current at a voltage of higher than 1 kV or higher than 100 kV.

The FIGURE additionally shows that the conductor assembly 1 can comprise a permanent connection 6*d* by means of which the support 6 is attached permanently to the electrical conductor 2. The conductor assembly 1 can comprise a contact disk 4 that is arranged between the support 6 and the electrical conductor 2 in the longitudinal direction 12 and via which the electrical conductor 2 is connected electrically conductively to the surge arrester 3 in the operating state. The FIGURE shows that the contact disk 4 can have a first end, which makes contact with the electrical conductor 2, and a second end, which makes contact with the support 6. The contact disk 4 can be connected permanently to the electrical conductor 2. To this end, the contact disk 4 can be screwed to the electrical conductor 2. As a result, the electrical conductor 2 supports the support 6 indirectly via the contact disk 4. In order to make the permanent connection 6*d*, the contact disk 4 can first be screwed to the support 6, and the contact disk 4 can then be screwed to the electrical conductor 2.

As can be seen from the FIGURE, the surge arrester 3 can comprise a conductor connection 7, at least part of which is arranged so as to be moveable relative to the remaining surge arrester 3 and is therefore designed to switch the surge arrester 3 between the operating state and the test state, the conductor connection 7 projecting further from the remaining surge arrester 3 in the operating state than in the test state. By way of example, the conductor connection 7 can comprise an electrically conductive contact pin 7*a*. In the operating state, the contact pin 7*a* can make contact with the contact disk 4 and in particular be introduced into a contact recess 7*b* arranged in the contact disk 4, as is also shown in the FIGURE. In the test state, the contact pin 7*a* can be arranged outside the contact recess 7*b*. The conductor connection 7 can comprise a drive 7*c* that is designed to move the contact pin 7*a* away from the electrical conductor 2 in order to put the surge arrester 3 into the test state, and to move the contact pin 7*a* toward the electrical conductor 2 in order to put the surge arrester 3 into the operating state. The conductor connection can comprise a drive rod 7*d*, a hand crank 7*e* and a gearing that is designed to translate a rotation of the hand crank 7*e* into a longitudinal movement of the drive rod 7*d*. The drive rod 7*d* can be coupled to the contact pin 7*a* in such a way that the longitudinal movement of the drive rod 7*d* results in a longitudinal movement of the contact pin 7*a*.

The conductor assembly 1 can comprise a moving connection 6*e* by means of which the surge arrester 3 and the support 6 are coupled to one another in such a way that the support 6 can move relative to the surge arrester 3 in the longitudinal direction 12. The surge arrester 3 can comprise a recess 6*c* that is arranged at that longitudinal end of the surge arrester 3 that faces the electrical conductor 2, and in which a first longitudinal end of the support 6 is arranged. The recess 6*c* can have, between the support 6 and the surge arrester 3, a flexible ring 6*f* arranged in it, the axis of rotation of which is substantially parallel to the longitudinal direction 12. The provision of the ring 6*f* allows the support 6 to move relative to the surge arrester 3 in the longitudinal direction 12 by virtue of either the support 6 or the surge arrester 3 sliding over the ring 6*f*. The ring 6*f* can comprise PTFE or consist of PTFE, for example. In order to fix the ring 6*f*, either the support 6 or the surge arrester 3 can comprise a groove into which the ring 6*f* is introduced. It is also conceivable for there to be a plurality of the rings 6*f* and a respective groove for each of the rings 6*f*. The FIGURE also shows that there can be provision for a gap 6*h* between the surge arrester 3 and the support 6 in the longitudinal direction 12.

The surge arrester 3 can comprise a contact hood 5*a* that is arranged at that longitudinal end of the surge arrester 3 that faces the electrical conductor 2, and in which the recess 6*c* is arranged. The contact hood 5*a* can be electrically conductive.

The conductor assembly 1 can comprise an electrically conductive element that is designed to connect the support 6 electrically conductively to the surge arrester 3, in particular to the contact hood 5*a*. The electrically conductive element can be arranged in the recess 6*c*. By way of example, the electrically conductive element can make contact with the contact piece 5*b* and the surge arrester 3, in particular the contact hood 5*a*. In a first example, the electrically conductive element can be a contact spring 6*g*. The contact spring 6*g* can be a helical spring, for example. The helical spring can be designed without a longitudinal end, for example, i.e. in the form of a closed ring. In a second example, the electrically conductive element can be a socket that comprises inwardly projecting lamellae. The socket can accommodate the first longitudinal end of the support 6.

Moreover, the axis of rotation of the socket can be substantially parallel to the longitudinal direction 12.

The FIGURE shows that the support 6 can comprise a support insulator 6*a*, which is arranged at that longitudinal end of the support 6 that faces the electrical conductor 2, and a contact piece 6*b*, which is arranged at that longitudinal end of the support 6 that is remote from the electrical conductor 2. The support insulator 6*a* can be electrically insulating. To this end, the support insulator 6*a* can comprise a resin or can consist of the resin, the resin being able to be a cast resin. Alternatively, the support insulator can comprise a ceramic material or can consist of the ceramic material. The contact piece 6*b* can be electrically conductive. The contact piece 6*b* can be arranged in the recess 6*c*. The inside of the longitudinal end of the support insulator 6*a* that is remote from the electrical conductor 2 can moreover comprise an electrode, not shown, that is connected electrically conductively to the contact piece 6*b*. This allows partial discharges to be prevented.

The FIGURE shows that the surge arrester 3 can comprise a varistor 5*b* or a plurality of varistors 5*b*. The varistor 5*b* or varistors 5*b* can be metal oxide varistors (MOV). The varistor 5*b* or varistors 5*b* can be arranged at that longitudinal end of the contact hood 5*a* that is remote from the electrical conductor 2. The longitudinal end of the varistor 5*b* or varistors that is remote from the contact hood 5*a* can be electrically conductively connected to a ground 11. The FIGURE also shows that the surge arrester 3 can comprise an active part 5 in addition to the conductor connection 7, the active part 5 comprising the contact hood 5*a* and the varistor 5*b* or varistors 5*b*.

As can be seen from the FIGURE, the conductor assembly 1 can comprise a housing 8 that encapsulates the electrical conductor 2, the surge arrester 3 and the support 6. The electrical conductor 2 can be supported by the housing 8 and/or by a wall that separates two chambers in the housing 8 from one another. The housing 8 can also be a part of the ground 11. The conductor assembly 1 can comprise a bushing insulator 9 that is designed to hold the electrical conductor 2 and insulate it from the housing 8. The bushing insulator 9 can comprise an electrode 9*a* to which the electrical conductor 2 is electrically conductively attached. Moreover, the conductor assembly 1 can comprise an adapter ring 10 that is screwed between the housing 8 and the bushing insulator 9, the bushing insulator 9 insulating the electrical conductor 2 from the adapter ring 10. The electrode 9*a* can be cast in a resin of the bushing insulator 9. The resin can be an epoxy resin, for example.

The FIGURE shows that the longitudinal direction 12 is arranged in the horizontal direction. Alternatively, it is also conceivable for the longitudinal direction 12 to have a component in the vertical direction or to be arranged in the vertical direction.

The invention claimed is:

1. A conductor assembly, comprising:

a housing;

an electrical conductor;

a surge arrester disposed in said housing and having a longitudinal direction, an operating state and a test sate, said surge arrester configured to limit an overvoltage occurring in said electrical conductor in said operating state, and said surge arrester not configured to limit the overvoltage in said test state; and an electrically insulating support disposed in said housing between said surge arrester and said electrical conductor in said longitudinal direction, said electrically insulating support being supported by said electrical conductor and said surge arrester being supported by said electrically insulating support;

said surge arrester having one side connected to ground and another side connected to said electrically insulating support.

2. The conductor assembly according to claim 1, wherein said surge arrester includes a conductor connection, at least part of said conductor connection being moveable relative to a remainder of said surge arrester, permitting said conductor connection to switch said surge arrester between said operating state and said test state, said conductor connection projecting further from said remainder of said surge arrester in said operating state than in said test state.

3. The conductor assembly according to claim 1, which further comprises a moving connection coupling said surge arrester and said electrically insulating support to one another, and permitting said electrically insulating support to move relative to said surge arrester in said longitudinal direction.

4. The conductor assembly according to claim 3, wherein said surge arrester and said electrically insulating support define a gap therebetween in said longitudinal direction.

5. The conductor assembly according to claim 3, wherein:

said surge arrester has an end facing said electrical conductor;

said surge arrester has a recess formed therein at said longitudinal end of said surge arrester facing said electrical conductor; and said electrically insulating support has a first longitudinal end disposed in said recess; and a flexible ring is disposed in said recess between said electrically insulating support and said surge arrester, said flexible ring having an axis of rotation substantially parallel to said longitudinal direction.

6. The conductor assembly according to claim 3, wherein:

said surge arrester has a longitudinal end facing said electrical conductor;

said surge arrester includes a contact hood disposed at said longitudinal end of said surge arrester facing said electrical conductor; and said moving connection is disposed in said contact hood.

7. The conductor assembly according to claim 6, which further comprises an electrically conductive element configured to electrically conductively connect said electrically insulating support to said contact hood.

8. The conductor assembly according to claim 1, which further comprises an electrically conductive element configured to electrically conductively connect said electrically insulating support to said surge arrester.

9. The conductor assembly according to claim 7, wherein said electrically conductive element is a contact spring or a helical spring or a socket including inwardly projecting lamellae.

10. The conductor assembly according to claim 1, which further comprises a permanent connection permanently attaching said electrically insulating support to said electrical conductor.

11. The conductor assembly according to claim 1, which further comprises an electrically conductive contact disk disposed between said electrically insulating support and said electrical conductor in said longitudinal direction, said electrically conductive contact disk electrically conductively connecting said electrical conductor to said surge arrester in said operating state.

12. The conductor assembly according to claim 11, wherein said electrically insulating support is permanently screwed to said electrically conductive contact disk.

13. The conductor assembly according to claim 11, wherein:

said surge arrester includes a conductor connection, at least part of said conductor connection being moveable relative to a remainder of said surge arrester, permitting said conductor connection to switch said surge arrester between said operating state and said test state, said conductor connection projecting further from said remainder of said surge arrester in said operating state than in said test state; and said electrically conductive contact disk has a contact recess formed therein; and said conductor connection includes a contact pin disposed in said contact recess in said operating state.

14. The conductor assembly according to claim 1, wherein said surge arrester includes a varistor or a plurality of varistors.

15. The conductor assembly according to claim 1, which further comprises a housing encapsulating said electrical conductor, said surge arrester and said electrically insulating support.

16. The conductor assembly according to claim 15, wherein said housing has two chambers and a wall separating said two chambers from one another in said housing, and said electrical conductor is supported by at least one of said housing or said wall.

* * * * *